United States Patent
Sacripante et al.

(10) Patent No.: US 9,971,265 B1
(45) Date of Patent: May 15, 2018

(54) TONER COMPOSITIONS AND PROCESSES

(71) Applicant: Xerox Corporation, Norwalk, CT (US)

(72) Inventors: Guerino G. Sacripante, Oakville (CA); Yulin Wang, Oakville (CA); Richard P. N. Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/440,578

(22) Filed: Feb. 23, 2017

(51) Int. Cl.
*G03G 9/087* (2006.01)
*G03G 9/093* (2006.01)
*G03G 9/08* (2006.01)
*G03G 9/09* (2006.01)
*C08G 63/00* (2006.01)

(52) U.S. Cl.
CPC ......... *G03G 9/09371* (2013.01); *C08G 63/00* (2013.01); *G03G 9/0825* (2013.01); *G03G 9/0904* (2013.01); *G03G 9/0918* (2013.01); *G03G 9/09321* (2013.01)

(58) Field of Classification Search
CPC .................................................. G03G 9/08755
See application file for complete search history.

(56) References Cited

U.S. PATENT DOCUMENTS

| 6,013,404 | A | * | 1/2000 | Feng | ..................... | G03G 9/0823 |
| | | | | | | 430/108.21 |
| 7,858,285 | B2 | | 12/2010 | Sacripante et al. | | |
| 9,405,207 | B2 | | 8/2016 | Wosnick et al. | | |
| 2013/0164668 | A1 | * | 6/2013 | Sacripante | ............. | G03G 9/081 |
| | | | | | | 430/108.1 |
| 2015/0160574 | A1 | * | 6/2015 | Morales-Tirado | ... | G03G 9/0804 |
| | | | | | | 430/108.8 |

* cited by examiner

*Primary Examiner* — Hoa V Le
(74) *Attorney, Agent, or Firm* — Eugene O. Palazzo

(57) ABSTRACT

Disclosed are toner compositions that contain a core of at least one bio-based amorphous polyester resin, at least one of a crystalline polyester resin, an optional colorant, and an optional wax, and where the core is coated with a polymeric shell.

21 Claims, No Drawings

TONER COMPOSITIONS AND PROCESSES

The present disclosure relates generally to toner compositions, and more specifically, to toners comprising a core of a bio-based amorphous resin, colorant, and a crystalline polyester resin, and a polymer shell thereover the core.

BACKGROUND

The environmental issues relating to the use of toxic chemicals has been well documented, especially as these chemicals adversely affect human beings, animals, trees, plants, fish, and other resources. Also, it is known that toxic chemicals usually cannot be safely recycled, are costly to prepare, cause the pollution of the world's water, add to the carbon footprint, and reduce the oil and coal reserves. Thus, there has been an emphasis on the development of green materials such as bio-based polymers that are biodegradable, and that minimize the economic impacts and uncertainty associated with the reliance on petroleum imported from unstable regions.

Biodegradable (bio) polymers have been referred to as a group of materials that respond to the action of enzymes, and that chemically degrade by their interaction with living organisms. Biodegradation may also occur through chemical reactions that are initiated by photochemical processes, oxidation and hydrolysis that result from the action of environmental factors. Also, biodegradable polymers can include a number of synthetic polymers that possess chemical functionalities present in naturally occurring compounds. However, several of these polymers can be costly to prepare, may not be fully biodegradable, and may decompose resulting in emitting carbon to the environment.

Numerous commercially available materials, such as toners, food packaging items, plastics, automobile tires, bottles, glasses, dishes, and the like, contain or are prepared from undesirable bisphenol A.

With an increased focus on environmental impact and on health, there is an interest and/or a need to find replacements for existing reagents to reduce environmental and health risks associated with toner. Some current polyester-based toners are composed of fossil fuel-based materials, including bisphenol A (BPA). BPA has been linked to a variety of health concerns, and several European countries, Canada and several U.S. states are targeting a ban of BPA.

Therefore, there is a need for toners and processes thereof that minimize, or substantially eliminate the disadvantages illustrated herein.

Also, there is a need for polymers and toners thereof with components derived from sources other than petroleum, and other than bisphenol A.

Additionally there is a need for economical low cost toners based on hybrid designs, and where the bisphenol containing core resins of terpoly-(propoxylated bisphenol A-terephthalate)-terpoly-(propoxylated bisphenol A-dodecenylsuccinate)-terpoly-(propoxylated bisphenol A-fumarate), and terpoly-(propoxylated bisphenol A-terephthalate)-terpoly-(propoxylated bisphenol A-dodecenylsuccinate)-terpoly-(ethoxylated bisphenol A-terephthalate)-terpoly-(ethoxylated bisphenol A-dodecenylsuccinate)-terpoly-(propoxylated bisphenol A-trimellitate)-terpoly-(ethoxylated bisphenol A-trimellitate) are replaced with the disclosed economical sustainable amorphous polyester resins, and which toners also comprise a polymeric shell.

Further, there is a need for economical processes for the preparation of core resins that can be selected for incorporation into toner compositions used to develop xerographic images.

Another need relates to toner compositions, inclusive of low melting toners, prepared by emulsion aggregation processes, and where the core resin selected is environmentally acceptable and is free of bisphenol A components.

Moreover, there is a need for xerographic systems that utilize for development green toners that are obtainable in high yields, exceeding for example 90 percent, possess consistent small particle sizes of, for example, from about 1 to about 15 microns in average diameter, are of a suitable energy saving shape, have a narrow particle size GSD, and that include various core shell structures.

There is also a need for bio-based amorphous polyesters that are capable of being converted to innocuous products by the action of suitable living organisms such as microorganisms.

Another need relates to toner compositions, inclusive of low melting toners, prepared by emulsion aggregation processes, and where the resins or polymers selected are environmentally acceptable, are free of bisphenol A components, and which are less costly than some known polyesters based on bisphenol.

Moreover, there remains a need for toners with acceptable and improved characteristics relating, for example, to fixing temperature latitudes and blocking temperatures of, for example, a blocking temperature of from about 50° C. to about 60° C.

There is also a need for toners with excellent gloss and cohesion properties, acceptable minimum fixing temperatures, excellent hot and cold offset temperatures, and which toners possess desirable particle size diameters.

Further, there is a need for toner compositions that do not substantially transfer, or offset onto a xerographic fuser roller, referred to as hot or cold offset depending on whether the temperature is below the fixing temperature of the paper (cold offset), or whether the toner offsets onto a fuser roller at a temperature above the fixing temperature of the toner (hot offset).

Also, there is a need for toners that can be economically prepared and where low cost crystalline polyester resins are selected.

Moreover, there is a need for processes that enable the generation of enhanced crystallinity in polyesters.

Yet additionally, there is a need for polyester based toners with low fixing temperatures, such as from about 100° C. to about 130° C., and with a broad fusing latitude, such as from about 50° C. to about 90° C.

Another need resides in providing toners prepared by emulsion/aggregation/coalescent methods with improved blocking temperatures of, for example, from about 50° C. to about 60° C., from about 51° C. to about 54° C., or from about 53° C. to about 55° C.

Bio-based compositions that can be selected for nontoners, such as packaging materials, are also needed.

These and other needs and advantages are achievable in embodiments with the processes and compositions disclosed herein.

SUMMARY

Disclosed is a toner composition comprising a core comprising a bio-based amorphous polyester resin, a crystalline polyester resin, and colorant, and a polymer shell thereover said core.

Also, disclosed is a toner composition comprising a core comprising a mixture of a phenol free crystalline polyester, a bisphenol free bio-based amorphous polyester resin, colorant and optional wax, and where said bio-based amorphous polyester is selected from the group consisting of poly(bis-rosin-neopentylene-terephthalate), poly (bis-rosin-neopentylene-isophthalate), copoly-(bis-rosin-neopentylene-terephthalate)-copoly-(bis-rosin-neopentylene-succinate), copoly-(bis-rosin-neopentylene-isophthalate)-copoly-(bis-rosin-neopentylene-succinate), and mixtures thereof.

Further disclosed are toner compositions comprising a core comprising a mixture of a non-bis phenol crystalline polyester, a bio-based amorphous polyester resin, an optional colorant, and an optional wax, and where the bio-based amorphous polyester is generated in accordance with the following reaction scheme

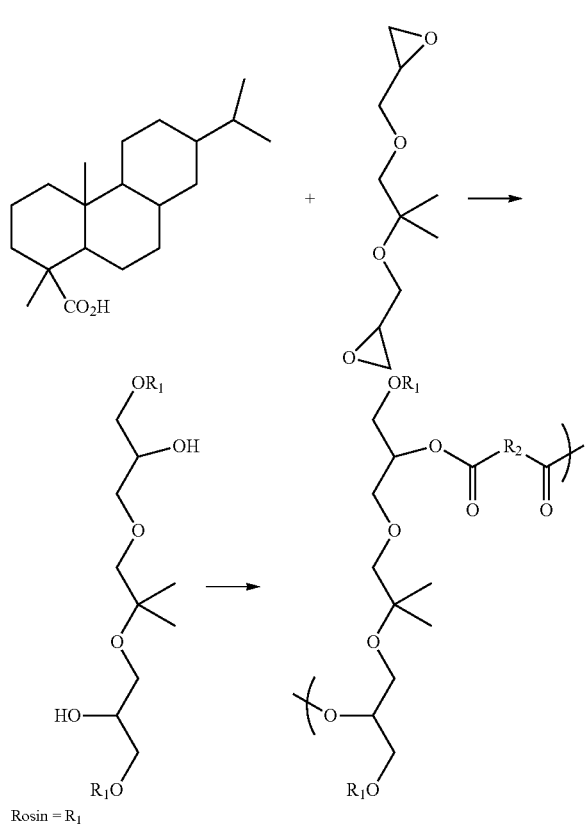

Rosin = R₁ wherein $R_1$ is a rosin, and $R_2$ is an arylene, and which core is encased within a styrene acrylate shell.

Yet further disclosed is a toner composition comprising a core of at least one bio-based amorphous polyester resin, at least one crystalline polyester, at least one wax and at least one colorant, and thereover at least one polymer shell encasing said core, and wherein said shell is, for example, selected from the group consisting of a styrene acrylate and a polystyrene acrylate amorphous resin.

Additionally disclosed are compositions comprising a core of at least one bio-based amorphous polyester resin, and at least one crystalline polyester, and at least one styrene acrylate shell encasing said core.

Moreover, there is illustrated herein toner compositions based on hybrid designs and processes thereof comprising forming a core by mixing at least one bisphenol A free crystalline polyester, at least one bisphenol A free amorphous polyester resin containing a rosin acid, or a salt of a rosin acid represented by at least one of the following formulas/structures

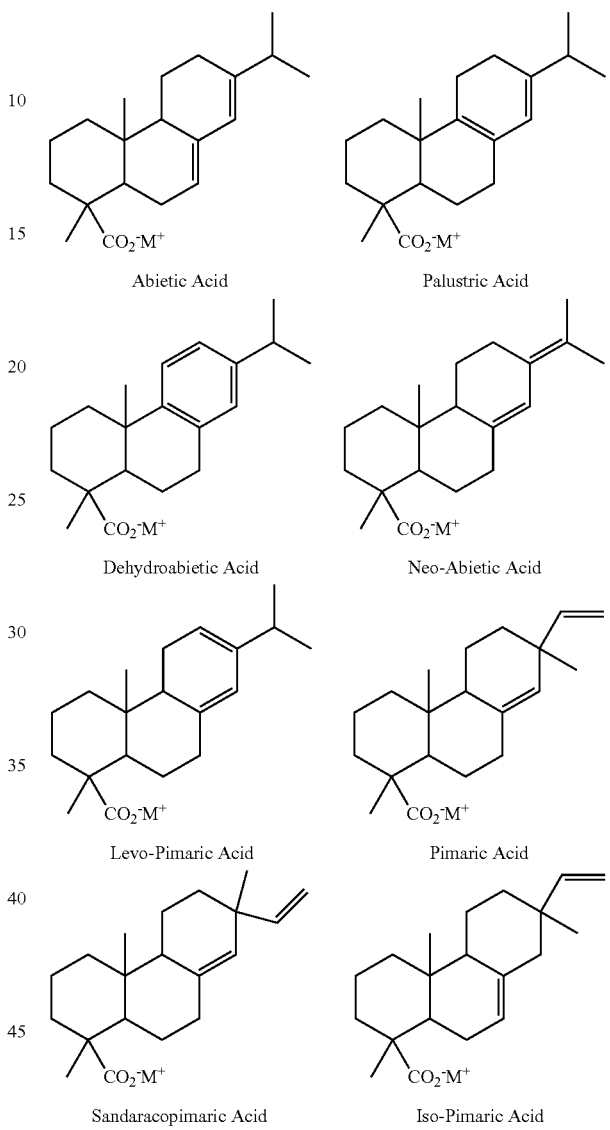

wherein M is a hydrogen atom, $NH_4$, or a metal, and which core is encased in at least one shell, such as from about 1 shell to about 5 shells, and more specifically, from about 1 shell to about 3 shells, and yet more specifically, from about 1 shell to about 2 shells, of a styrene acrylate resin, followed by aggregating and coalescing to form toner particles.

Bio-based, or bio refers to a reagent, or to a product that is comprised, in whole, or in part, of a biological product, including plant, animal and marine materials, or derivatives thereof. Generally, a bio based, bio-based, or biomaterial is biodegradable, that is it is substantially or completely biodegradable, where substantially refers, for example, to greater than from about 50 percent to greater than about 70 percent of the material being degraded from its original molecule to another form by a biological or environmental mechanism, such as, action thereon by bacteria, animals, plants, light, temperature, oxygen and so on in a matter of days, matter of weeks, a year or more, but generally no longer than two years. Such a resin can be considered sustainable, that is this resin has no negative impact on the environment, or only has a minimal but acceptable negative impact on the environment.

Also, biodegradable, bio-based, and sustainable refer, for example, to organic materials, such as plant and animal matter, and other substances originating from living organisms, or artificial materials, and that can be biodegradable, and that can be subject to nontoxic degradation by microorganisms.

Crystalline Polyesters

A number of crystalline polyesters, in various effective amounts, such as for example, from 5 to about 14 percent by weight, from about 5 percent by weight to about 12 percent by weight, or from about 7 percent by weight to about 12 percent by weight, based on the solids of the toner and optional additives when present, can be selected for the toners illustrated herein, such as, for example, poly(1,6-hexylene-1,12-dodecanoate) available from DIC Chemicals (previously known as Dainippon Ink and Chemicals), poly(1,9-nonylene-succinate) available from DIC Chemicals, poly(1,2-propylene-diethylene-terephthalate), poly(ethylene-terephthalate), poly(propylene-terephthalate), poly(butylene-terephthalate), poly(pentylene-terephthalate), poly(hexalene-terephthalate), poly(heptylene-terephthalate), poly(octylene-terephthalate), poly(ethylene-sebacate), poly(propylene-sebacate), poly(butylene-sebacate), poly(nonylene-sebacate), poly(ethylene-adipate), poly(propylene-adipate), poly(butylene-adipate), poly(pentylene-adipate), poly(hexylene-adipate), poly(heptylene-adipate), poly(octylene-adipate), poly(ethylene-glutarate), poly(propylene-glutarate), poly(butylene-glutarate), poly(pentylene-glutarate), poly(hexalene-glutarate), poly(heptylene-glutarate), poly(octylene-glutarate), poly(ethylene-pimelate), poly(propylene-pimelate), poly(butylene-pimelate), poly(pentylene-pimelate), poly(hexalene-pimelate), poly(heptadene-pimelate), poly(1,2-propylene itaconate), poly(ethylene-succinate), poly(propylene-succinate), poly(butylene-succinate), poly(pentylene-succinate), poly(hexylene-succinate), poly(octylene-succinate), poly(decylene-decanoate), poly(ethylene-decanoate), poly(ethylene dodecanoate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and optionally mixtures thereof, and the like.

A specific crystalline polyester selected for the toners disclosed herein is poly(1,6-hexylene-1,12-dodecanoate), which is commercially available, and can be generated by the reaction of dodecanedioic acid and 1,6-hexanediol, and more specifically, wherein the crystalline polyester is poly(1,6-hexylene-1,12-dodecanoate) of the following structure The crystalline resins selected for the disclosed toners can possess a number average molecular weight ($M_n$), as measured by gel permeation chromatography (GPC) using polystyrene standards of, for example, from about 1,000 to about 50,000, or from about 2,000 to about 25,000. The weight average molecular weight ($M_w$) of the crystalline polyester resins for the disclosed toners can be, for example, from about 2,000 to about 100,000, or from about 3,000 to about 80,000, as determined by GPC using polystyrene standards. The molecular weight distribution ($M_w/M_n$) of the disclosed toner crystalline polyester resins is, for example, from about 2 to about 6, and more specifically, from about 2 to about 4.

The disclosed crystalline polyester resins, which resins are available from a number of sources, such as DIC Chemicals, can be prepared by a polycondensation process by reacting suitable organic diols, or diesters, and suitable organic diacids in the presence of polycondensation catalysts. Generally, for the preparation, a stoichiometric equimolar ratio of organic diol and organic diacid is utilized, however, in some instances, wherein the boiling point of the organic diol is from about 180° C. to about 230° C., an excess amount of diol, such as ethylene glycol or propylene glycol of from about 0.2 to 1 mole equivalent, can be utilized and removed during the polycondensation process by distillation. The amount of catalyst utilized varies, and can be selected in amounts, such as for example, from about 0.01 mole percent to about 1 mole percent, or from about 0.1 mole percent to about 0.75 mole percent of the crystalline polyester resin.

Examples of organic diacids and diesters selected for the preparation of the crystalline polyester resins are as illustrated herein, and include fumaric, maleic, oxalic acid, succinic acid, glutaric acid, adipic acid, suberic acid, azelaic acid, sebacic acid, decanoic acid, 1,2-dodecanoic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid, diester, or mixtures thereof can be selected in an amount of, for example, from about 45 mole percent to about 55 mole percent of the crystalline polyester resin, or from about 48 mole percent to about 52 mole percent of the crystalline polyester resin.

Examples of organic diols selected for the preparation of the disclosed crystalline polyesters, include aliphatic diols, selected in an amount of, for example, from about 1 to about 10, or from 3 to about 7 mole percent of the crystalline polyester resin that may be present in the reaction mixture, or added thereto, and with, for example, from about 2 carbon atoms to about 36 carbon atoms, are 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, alkylene glycols like

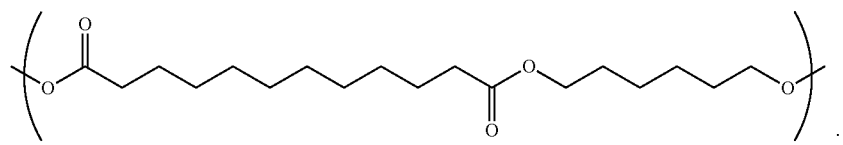

ethylene glycol or propylene glycol, and the like. The organic diols can be selected in various effective amounts, such as for example, from about 45 mole percent to about 55 mole percent of the crystalline polyester resin, or from about 48 to about 52 mole percent of the crystalline polyester resin.

Amorphous Polyesters

A number of available bio-based amorphous polyesters in various effective amounts, such as, for example, from about 10 percent by weight to about 60 percent by weight, or from about 25 percent by weight to about 50 percent by weight based on the solids, including optional additives when present, can be selected for the toners illustrated herein. Bio-based amorphous polyester examples can be prepared by the following alternative process reaction schemes I and II.

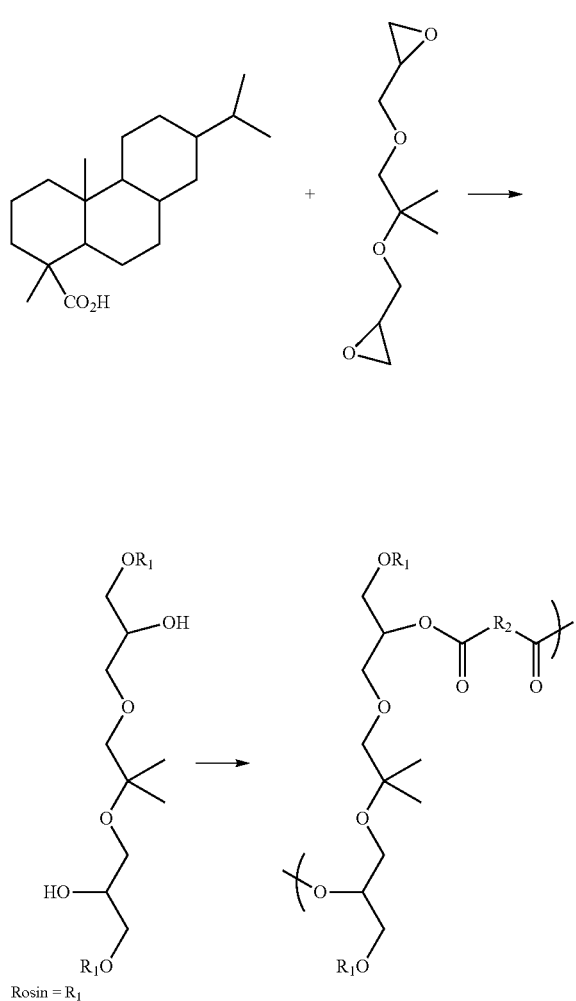

wherein $R_2$=arylene: $CH_2$—$CH_2$; (8:1 ratio).

First there is prepared a rosin diol from a bis-epoxy monomer, and then followed by reacting the rosin diol with a suitable acid, such as a carboxylic acid, like terephthalic acid (TPA), or sebacic acid (SA) and an alkylene glycol, such as 1,2-propylene glycol (PG), per the following reaction scheme.

wherein H-Rosin refers to a hydrogenated rosin acid.

More specifically, the disclosed sustainable bio-based amorphous polyester resins can be derived from the reaction of tetrahydroabietic acid (a rosin acid), an organic diol such as a bis-(epoxy-propyl)-neopentylene glycol, or a bio-based propylene glycol and a bio-based succinic acid. The overall bio-based content of the amorphous resins are, for example, from about 50 percent by weight to about 65 percent by weight, and more specifically, from about 54 percent by weight to about 60 percent by weight, while the bio-based content of the toner is, for example, from about 20 percent by weight to about 35 percent by weight, more specifically, from about 20 percent by weight to about 25 percent by weight, and yet more specifically, about 23.5 percent by weight.

Also, yet more specifically the preparation of the disclosed amorphous bio-based resins involves a first sequence where a bio-based organic acid, such as a rosin acid, is reacted with a bis-organo-epoxide reactant to result in an organic diol such as a bis-(epoxy-propyl)-neopentylene glycol.

In general, for toners containing rosin-based resins, please see U.S. Pat. Nos. 8,580,472 and 8,431,303, both of which are incorporated herein in their entirety.

In a second sequence, the above generated organic diol bis-(epoxy-propyl)-neopentylene glycol can be reacted with, for example, terephthalic acid, succinic acid and propanediol. Generally, in such reactions, an excess of polyol is used like, for example, about 2.5 equivalents of 1,2-propanediol, and an acid can be added to control the acid value of the bio-based resin such that an acid value is, for example, from about meq of 8 KOH/g to about 16 meq of KOH/g.

In embodiments, the bio-based amorphous polyester resin can be prepared in a simplified one-pot process, accomplished by first preparing an organic diol, followed by adding monomers, such as terephthalic acid, 1,2-propanediol, and succinic acid to form the polyester resin. Furthermore, for this reaction an excess amount of 1,2-propanediol can be avoided primarily because the ratio of diol to diacid is maintained in the one-pot process. The thermal properties of the resulting one-pot resin are the same as, or similar to that of polyester produced by the illustrated herein first sequence and second sequence processes.

When the rosin acid is reacted with an organic bis-epoxide during a ring-opening reaction of the epoxy group, it combines at the carboxylic acid group of the rosin acid to form a joined molecule of an organic-diol. This known reaction is compatible with the one-pot reaction conditions disclosed herein for generating a bio-based resin. A catalyst can be included in the reaction mixture to form the rosin ester. Suitable catalysts include tetra-alkyl ammonium halides, such as, tetraethyl ammonium bromide, tetraethyl ammonium iodide, tetraethyl ammonium chloride, tetra-alkyl phosphonium halides, and the like. The reaction can be conducted in the absence of air and, for example, under a nitrogen atmosphere. Further, the reaction can be accomplished at an elevated temperature, such as, from about 100° C. to about 200° C., from about 105° C. to about 175° C., or from about 110° C. to about 170° C. The progress of this reaction can be monitored by evaluating the acid value of the reaction product, and when all or most of the rosin acid has reacted, the overall acid value of the product is, for example, equal to about or less than about 4 milliequivalents, meq of KOH/g, less than about 1 meq of KOH/g, or about 0 meq of KOH/g, which acid values of the amorphous resin can be controlled by adding an excess of the bis-epoxide monomer.

Examples of bio-based amorphous polyesters selected for the disclosed toners include poly (bis-rosin-neopentylene-terephthalate), poly(bis-rosin-neopentylene-isophthalate), copoly-(bis-rosin-neopentylene-terephthalate)-copoly-(bis-rosin-neopentylene-succinate), copoly-(bis-rosin-neopentylene-isophthalate)-copoly-(bis-rosin-neopentylene-succinate), mixture thereof, and the like.

The bio-based amorphous polyester resins can possess, for example, a number average molecular weight ($M_n$), as measured by gel permeation chromatography (GPC) using polystyrene standards of, for example, from about 5,000 to about 100,000, or from about 5,000 to about 50,000. The weight average molecular weight ($M_w$) of the amorphous polyester resins can be, for example, from about 2,000 to about 100,000, or from about 5,000 to about 80,000, as determined by GPC using polystyrene standards. The molecular weight distribution ($M_w/M_n$) of the amorphous polyester resins is, for example, from about 2 to about 6, and more specifically, from about 2 to about 4.

Processes for the preparation of a number of the disclosed bio-based amorphous polyesters are illustrated in Xerox Corporation U.S. Pat. No. 9,329,510 titled Simplified Process For Sustainable Toner, the entire disclosure of which is totally incorporated herein by reference.

Rosins

The rosin acids selected for the formation of the bio-based amorphous polyester resin can be represented by at least one of the following formulas/structures

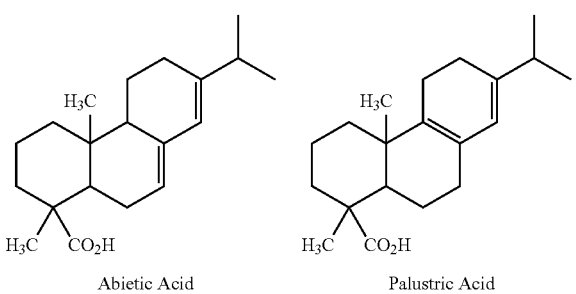

Abietic Acid        Palustric Acid

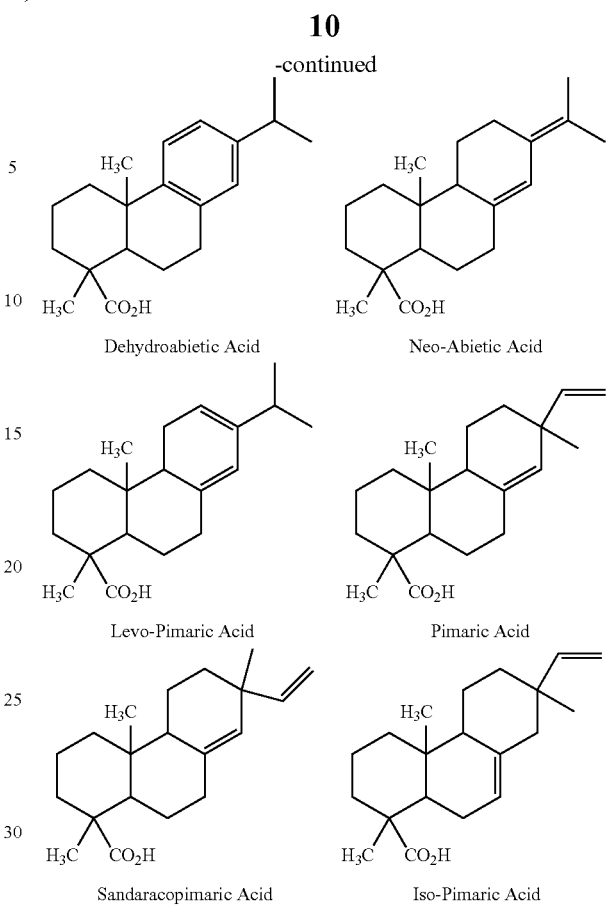

Dehydroabietic Acid        Neo-Abietic Acid

Levo-Pimaric Acid        Pimaric Acid

Sandaracopimaric Acid        Iso-Pimaric Acid and the salts thereof, are available from Arakawa Chemicals, Pinova Incorporated Arizona Chemicals, and Eastman Chemicals.

Specific rosin acids selected for the formation of the bio-based amorphous polyester resin can include dehydroabietic acid represented by the following formula/structure

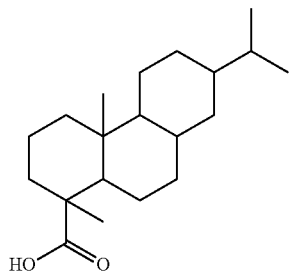

Examples of rosin acids can be obtained by disproportionating or hydrogenating natural rosins, such as gum rosin, tall oil rosin or wood rosin, and purifying them. The natural rosins generally contain two or more resin acids, such as pimaric acid, sandarachpimaric acid, parastric acid, isopimaric acid, abietic acid, dehydroabietic acid, neoabietic acid, dihydropimaric acid, dihydroabietic acid, and tetrahydroabietic acid. These acids are typically obtained from tree sap, tree stumps, or byproduct of the pulp and paper manufacturing process.

More specifically, the rosin acids selected for the formation of the disclosed bio-based amorphous polyester resins can be comprised of wood rosins, which are obtained by harvesting pine tree stumps after they have remained in the ground for about 10 years so that the bark and sapwood decay, and extrude the resinous material extract thus resulting in the rosin acids with similar formulas/structures as those illustrated herein, and where the various proportions of the individual acids may vary. For example, the major components of abietic acid and dehydroabietic acid amounts in the wood rosins are typically in excess of about 50 percent by weight, such as from about 55 percent by weight to about 95 percent by weight, or from about 70 percent by weight to about 90 percent by weight of the mixture solids. The amount of abietic acid present in the wood rosin acids mixture can be controlled by known purification methods, such as distillation, and where the amount subsequent to purification of this acid is believed to be from about 70 percent by weight to about 80 percent by weight of the rosin acid mixture. Similarly, the amount of dehydroabietic acid can vary including when this acid is subjected to purification by known distillation methods, and which amount is, for example, believed to be from about 65 to about 85 percent by weight.

Shells

The disclosed core comprised of a mixture of at least one of the bio-based amorphous polyester, at least one of the crystalline polyester, colorant when present, wax when present, and additives, are encased in at least one shell, such as from about 1 shell to about 5 shells, and more specifically, from about 1 shell to about 3 shells, and yet more specifically, from about 1 shell to about 2 shells, of a polymer shell of, for example, a styrene acrylate resin, a poly-styrene acrylate amorphous resin, and mixtures thereof.

Each shell can be of a known suitable effective thickness, such as for example, from about 0.2 micron to about 2 microns, or from about 0.5 micron to about 1 micron as measured with, for example, a Permascope.

Examples of styrene acrylates shell polymers or, resins include copolymers thereof of styrene and an acrylate selected, for example, from the group consisting of alky methacrylates and alkyl acrylates, such as methyl methacrylate, ethyl acrylate, ethyl methacrylate, butyl acrylate, butyl methacrylate, and the like, all available from Monsanto Chemicals. Examples of specific styrene acrylates selected for the disclosed shells include polystyrene acrylate, polystyrene methacrylate, polystyrene butadiene, polyacetate, polyacrylate, polymethacrylate, polystyrene-2-ethylhexyl acrylate, polystyrene-2-ethylhexyl methacrylate, mixtures thereof, and the like.

The shell resin may be applied to the coalesced toner, or to the aggregated particles by any method within the purview of those skilled in the art. Thus, an emulsion containing the shell resin may be combined with the aggregated particles so that the shell forms over the aggregated particles.

The formation of the shell over the aggregated particles may occur while heating the mixture to a temperature of from about 30° C. to about 80° C., or from about 35° C. to about 70° C. The formation of the shell may take place over a period of time of from about 5 minutes to about 10 hours, or from about 10 minutes to about 5 hours.

The shell may be present in an amount of from about 1 percent by weight to about 80 percent by weight of the toner components, from about 10 percent by weight to about 50 percent by weight of the toner components, or, from about 20 percent by weight to about 40 percent by weight of the toner components.

Optional Waxes

Numerous suitable waxes may be selected for the toners illustrated herein, and which waxes can be included in the amorphous polyester resin, the crystalline polyester resin, or in the amorphous polyester resin and the crystalline polyester mixture, in at least one shell, and in both the polyesters mixture and the at least one shell.

Examples of optional waxes included in the toner, or on the toner surface include polyolefins, such as polypropylenes, polyethylenes, and the like, such as those commercially available from Allied Chemical and Baker Petrolite Corporation; wax emulsions available from Michaelman Inc. and the Daniels Products Company; EPOLENE N-15™ commercially available from Eastman Chemical Products, Inc.; VISCOL 550-P™, a low weight average molecular weight polypropylene available from Sanyo Kasei K.K., and similar materials. Examples of functionalized waxes that can be selected for the disclosed toners include amines and amides of, for example, AQUA SUPERSLIP 6550™, SUPERSLIP 6530™ available from Micro Powder Inc.; fluorinated waxes, for example, POLYFLUO 190™ POLYFLUO 200™, POLYFLUO 523XF™, AQUA POLYFLUO 411™, AQUA POLYSILK 19™, POLYSILK 14™ all available from Micro Powder Inc.; mixed fluorinated, amide waxes of, for example, MICROSPERSION 19™ available from Micro Powder Inc.; imides, esters, quaternary amines, carboxylic acids, or acrylic polymer emulsions of, for example, JONCRYL 74™, 89™, 130™, 537™, and 538™ all available from SC Johnson Wax; chlorinated polypropylenes and polyethylenes available from Allied Chemical and Petrolite Corporation, and from SC Johnson Wax. A number of these disclosed waxes can be optionally fractionated, or distilled to provide specific cuts that satisfy desired viscosity and/or temperature criteria wherein the viscosity is, for example, about 10,000 cps, and the temperature is about 100° C.

In embodiments, the wax is in the form of a dispersion comprising, for example, a wax having a particle diameter of from about 100 nanometers to about 500 nanometers, or from about 100 nanometers to about 300 nanometers, water, and an anionic surfactant, or a polymeric stabilizer, and optionally a nonionic surfactant. In embodiments, the wax selected for the disclosed toners comprises polyethylene wax particles, such as POLYWAX® 655, POLYWAX® 725, POLYWAX® 850, or POLYWAX® 500 (the POLYWAX® waxes being commercially available from Baker Petrolite) and, for example, fractionated/distilled waxes, which are distilled parts of commercial POLYWAX® 655, see for example U.S. Pat. Nos. 7,553,596 and 7,749,670, both incorporated herein in their entirety. Other toner wax examples include FT-100 waxes available from Shell (SMDA), and FNP0092 available from Nippon Seiro. The surfactant used to disperse the wax can be, for example, an anionic surfactant, such as NEOGEN RK® commercially available from Daiichi Kogyo Seiyaku, TAYCAPOWER® BN2060 commercially available from Tayca Corporation, or DOWFAX® available from E.I. DuPont.

The toner wax amount is in embodiments from about 0.1 percent by weight to about 20 percent by weight, from about 0.5 percent by weight to about 15 percent by weight, from about 1 percent by weight to about 12 percent by weight, from about 1 percent by weight to about 10 percent by weight, from about 4 percent by weight to about 9 percent by weight, from about 1 percent by weight to about 5 percent by weight, from about 1 percent by weight to about 4 percent by weight, or from about 1 percent by weight to about 3 percent by weight, based on the toner solids.

Optional Colorants

Examples of toner colorants include pigments, dyes, mixtures of pigments and dyes, mixtures of pigments, mixtures of dyes, and the like. In embodiments, the colorant comprises carbon black, magnetite, black, cyan, magenta, yellow, red, green, blue, brown, other known colors, and mixtures thereof.

The toner colorant can be selected, for example, from cyan, magenta, yellow, and black pigment dispersions of each color in an anionic surfactant like NEOGEN RK™, or optionally in a non-ionic surfactant to provide, for example, pigment particles having a volume average particle diameter size of, for example, from about 50 nanometers to about 300 nanometers, or from about 125 nanometers to about 200 nanometers.

Toner colorant amounts vary, and can be, for example, in percent by weight based on the toner solids, of from about 1 to about 50, from about 2 to about 40, from about 2 to about 30, from about 1 to about 25, from about 1 to about 18, from about 1 to about 12, from about 1 to about 6, or from about 3 to about 10. When magnetite pigments are selected for the toner, the amounts thereof can be up to about 80 percent by weight of solids, like from about 40 to about 80 percent by weight, or from about 50 percent by weight to about 75 percent by weight based on the total solids.

Specific toner colorants that may be selected include PALIOGEN VIOLET 5100™ and 5890™ (BASF), NORMANDY MAGENTA RD-2400™ (Paul Ulrich), PERMANENT VIOLET VT2645™ (Paul Ulrich), HELIOGEN GREEN L8730™ (BASF), ARGYLE GREEN XP-111-S™ (Paul Ulrich), BRILLIANT GREEN TONER GR 0991™ (Paul Ulrich), LITHOL SCARLET D3700™ (BASF), TOLUIDINE RED™ (Aldrich), scarlet for THERMOPLAST NSD RED™ (Aldrich), LITHOL RUBINE TONER™ (Paul Ulrich), LITHOL SCARLET 4440™, NBD 3700™ (BASF), BON RED C™ (Dominion Color), ROYAL BRILLIANT RED RD-8192™ (Paul Ulrich), ORACET PINK RF™ (Ciba Geigy), PALIOGEN RED 3340™ and 3871K™ (BASF), LITHOL FAST SCARLET L4300™ (BASF), HELIOGEN BLUE D6840™, D7080™, K7090™, K6910™ and L7020™ (BASF), SUDAN BLUE OS™ (BASF), NEOPEN BLUE FF4012™ (BASF), PV FAST BLUE B2G01™ (American Hoechst), IRGALITE BLUE BCA™ (Ciba Geigy), PALIOGEN BLUE 6470™ (BASF), SUDAN II™, III™ and IV™ (Matheson, Coleman, Bell), SUDAN ORANGE™ (Aldrich), SUDAN ORANGE 220™ (BASF), PALIOGEN ORANGE 3040™ (BASF), ORTHO ORANGE OR 2673™ (Paul Ulrich), PALIOGEN YELLOW 152™ and 1560™ (BASF), LITHOL FAST YELLOW 0991K™ (BASF), PALIOTOL YELLOW 1840™ (BASF), NOVAPERM YELLOW FGL™ (Hoechst), PERMANERIT YELLOW YE 0305™ (Paul Ulrich), LUMOGEN YELLOW D0790™ (BASF), SUCO-GELB 1250™ (BASF), SUCO-YELLOW D1355™ (BASF), SUCO FAST YELLOW D1165™, D1355™ and D1351™ (BASF), HOSTAPERM PINK E™ (Hoechst), FANAL PINK D4830™ (BASF), CINQUASIA MAGENTA™ (DuPont), PALIOGEN BLACK L9984™ (BASF), PIGMENT BLACK K801™ (BASF), and carbon blacks such as REGAL® 330 (Cabot), CARBON BLACK 5250™ and 5750™ (Columbian Chemicals), and the like, or mixtures thereof.

Colorant examples include pigments present in water based dispersions, such as those commercially available from Sun Chemical, such as for example, SUNSPERSE BHD 6011™ (Blue 15 Type), SUNSPERSE BHD 9312™ (Pigment Blue 15), SUNSPERSE BHD 6000™ (Pigment Blue 15:3 74160), SUNSPERSE GHD 9600™ and GHD 6004™ (Pigment Green 7 74260), SUNSPERSE QHD 6040™ (Pigment Red 122), SUNSPERSE RHD 9668™ (Pigment Red 185), SUNSPERSE RHD 9365™ and 9504™ (Pigment Red 57), SUNSPERSE YHD 6005™ (Pigment Yellow 83), FLEXIVERSE YFD 4249™ (Pigment Yellow 17), SUNSPERSE YHD 6020™ and 6045™ (Pigment Yellow 74), SUNSPERSE YHD 600™ and 9604™ (Pigment Yellow 14), FLEXIVERSE LFD 4343™ and LFD 9736™ (Pigment Black 7), mixtures thereof, and the like. Water-based colorant dispersions that may be selected for the toner compositions disclosed herein include those commercially available from Clariant of, for example, HOSTAFINE Yellow GR™, HOSTAFINE Black T™ and Black TS™, HOSTAFINE Blue B2G™, HOSTAFINE Rubine F6B™, and magenta dry pigments, such as Toner Magenta 6BVP2213 and Toner Magenta EO2, which pigments can be dispersed in water and/or surfactants.

Examples of toner pigments selected and available in the wet cake or concentrated form containing water can be easily dispersed in water utilizing a homogenizer, or simply by stirring, ball milling, attrition, or media milling. In other instances, pigments are available only in a dry form, whereby a dispersion in water is effected by microfluidizing using, for example, a M-110 microfluidizer or an Ultimizer, and passing the pigment dispersion from about 1 to about 10 times through the microfluidizer chamber by sonication, such as using a Branson 700 sonicator, a homogenizer, ball milling, attrition, or, media milling with the optional addition of dispersing agents such as the aforementioned ionic or nonionic surfactants.

Magnetite colorant examples are Mobay magnetites MO8029™, MO8960™; Columbian magnetites, MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and mixtures thereof.

Specific examples of toner pigments include phthalocyanines, HELIOGEN BLUE L6900™, D6840™, D7080™, D7020™, PYLAM OIL BLUE™ PYLAM OIL YELLOW™, PIGMENT BLUE 1™ available from Paul Ulrich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Examples of magentas include, for example, 2,9-dimethyl substituted quinacridone and anthraquinone dye identified in the Color Index as CI 60710, CI Dispersed Red 15, diazo dye identified in the Color Index as CI 26050, CI Solvent Red 19, and the like, or mixtures thereof; examples of cyans include copper tetra(octadecyl sulfonamide) phthalocyanine, x-copper phthalocyanine pigment listed in the Color Index as C174160, CI Pigment Blue, and Anthrathrene Blue identified in the Color Index as DI 69810, Special Blue X-2137, and mixtures thereof. Illustrative examples of yellows that may be selected for the disclosed toners include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICO BLACK™ and cyan components, may also be selected as the disclosed toner pigments. The pigment dispersion comprises, for example, pigment particles dispersed in an aqueous medium with an anionic dispersant/surfactant, or a nonionic dispersant/surfactant, and wherein the dispersant/surfactant amount is from about 0.5 percent by weight to about 10 percent by weight.

Toner Compositions

The toner compositions illustrated herein can be prepared by emulsion aggregation/coalescence methods as described in a number of patents inclusive, for example, of U.S. Pat. Nos. 5,593,807; 5,290,654; 5,308,734; 5,370,963; 6,120,967; 7,029,817; 7,736,832; and 8,466,254, the disclosures of each of these patents being totally incorporated herein by reference.

In embodiments, toner compositions may be prepared by a number of the known emulsion-aggregation processes, such as a process that includes aggregating a mixture of an optional colorant, an optional wax and optional toner additives, with an emulsion comprising a bio-based amorphous polyester resin and a crystalline polyester resin, and then coalescing the aggregated mixture. The resin mixture emulsions may be prepared by the known phase inversion process, such as by dissolving the bio-based amorphous polyester resin, and the crystalline polyester resin in a suitable solvent, followed by the addition of water like deionized water containing a stabilizer, and optionally a surfactant. See in general U.S. Pat. Nos. 9,428,622 and 9,410,037, both of which are incorporated herein in their entirety.

Examples of optional suitable stabilizers that are selected for the toner processes illustrated herein include aqueous ammonium hydroxide, water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. In embodiments, a particularly desirable stabilizer is sodium bicarbonate or ammonium hydroxide. The stabilizer is typically present in amounts of, for example, from about 0.1 percent to about 5 percent, such as from about 0.5 percent to about 3 percent, by weight of the colorant, wax and resin mixture. When such salts are added as a stabilizer, it may be desirable in embodiments that incompatible metal salts are not present in the composition.

Suitable dissolving solvents include alcohols, ketones, esters, ethers, chlorinated solvents, nitrogen containing solvents, and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. The resin mixture of the amorphous polyester and crystalline polyester can be dissolved in the solvent at elevated temperature of from about 40° C. to about 80° C., from about 50° C. to about 70° C., or from about 60° C. to about 65° C., with the desirable temperature being lower than the glass transition temperature of the wax and resin mixture of the bio-based amorphous polyester and the crystalline polyester. In embodiments, the resins are dissolved in the solvent at elevated temperature, but below the boiling point of the solvent, such as from about 2° C. to about 15° C. or from about 5° C. to about 10° C. below the boiling point of the solvent.

Optionally, a surfactant may be added to the disclosed aqueous emulsion medium to afford additional stabilization to the resin mixtures. Suitable surfactants include anionic, cationic and nonionic surfactants.

Anionic surfactant examples include sodium dodecylsulfate (SDS), sodium dodecyl benzene sulfonate, sodium dodecyl naphthalene sulfate, dialkyl benzenealkyl, sulfates and sulfonates, abitic acid, and the NEOGEN® brand of anionic surfactants. An example of a suitable anionic surfactant is NEOGEN® R-K available from Daiichi Kogyo Seiyaku Co. Ltd. (Japan), or TAYCAPOWER® BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL® and ALKAQUAT® available from Alkaril Chemical Company, SANISOL® (benzalkonium chloride), available from Kao Chemicals, and the like. An example of a suitable cationic surfactant is SANISOL® B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc Inc. as IGEPAL® CA-210, IGEPAL® CA-520, IGEPAL® CA-720, IGEPAL® CO-890, IGEPAL® CG-720, IGEPAL® CO-290, ANTAROX® 890 and ANTAROX® 897. An example of a suitable nonionic surfactant is ANTAROX® 897 available from Rhone-Poulenc Inc., which consists primarily of alkyl phenol ethoxylate.

With further regard to the emulsion/aggregation/coalescence processes, following aggregation, the aggregates are coalesced as illustrated herein. Coalescence may be accomplished by heating the resulting aggregate mixture to a temperature that is about 5° C. to about 30° C. above the glass transition temperature (Tg) of the core mixture containing the bio-based amorphous polyester resin. Generally, the aggregated mixture is heated to a temperature of about 50° C. to about 90° C. In embodiments, the aggregated mixture may also be stirred at from about 200 to about 750 revolutions per minute to coalesce the particles, and where coalescence may be accomplished over a period of, for example, from about 3 to about 9 hours.

Optionally, during coalescence the particle size of the toner particles may be controlled to a desired size by adjusting the pH of the mixture obtained. Generally, to control the particle size, measured by a Coulter Counter, the pH of the mixture can be adjusted to between about 5 to about 8 using a base such as, for example, sodium hydroxide.

After coalescence, the mixture may be cooled to room temperature, typically from about 20° C. to about 25° C., and the toner particles generated may be washed with water and then dried. Drying may be accomplished by any suitable method including freeze drying, which is usually accomplished at temperatures of about −80° C. for a period of about 72 hours.

After aggregation and coalescence, the toner particles in embodiments have an average particle size diameter of from about 1 to about 15 microns, from about 4 to about 15 microns, or from about 6 to about 11 microns, such as about 7 microns as determined by a Coulter Counter. The volume geometric size distribution ($GSD_V$) of the prepared toner particles may be, for example, from about 1.20 to about 1.35 as determined by a Coulter Counter.

Moreover, in embodiments of the present disclosure a pre-toner mixture can be prepared by combining a colorant, and optionally a wax and other toner components, stabilizer, surfactant, and both the crystalline polyester and the bio-based amorphous polyester into an emulsion, or a plurality of the emulsions. The pH of the pre-toner mixture can be adjusted to from about 2.5 to about 4 by an acid such as, for example, acetic acid, nitric acid, or the like. Additionally, in embodiments, the pre-toner mixture may be optionally homogenized by mixing at, for example, from about 600 to about 4,000 revolutions per minute with, for example, a TKA ULTRA TURRAX T50 probe homogenizer.

Following the preparation of the pre-toner mixture, an aggregate mixture can be formed by adding an aggregating agent (coagulant) to the pre-toner mixture. The aggregating agent is generally an aqueous solution of a divalent cation, or a multivalent cation material. The aggregating agent may be, for example, polyaluminum halides, such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. The aggregating agent may be added to, for example, the pre-toner mixture at a temperature that is below the glass transition temperature (Tg) of the emulsion resin, and where the aggregating agent may be added in an amount of from about 0.05 pph to about 3 parts per hundred (pph) or from about 1 pph to about 10 pph with respect to the solids of the toner. The aggregating agent may be added to the pre-toner mixture over a period of from about 0 to about 60 minutes.

More specifically, in embodiments the toners of the present disclosure can be prepared by emulsion/aggregation/coalescence by (i) generating or providing a latex emulsion containing a mixture of a bio-based amorphous polyester resin, a crystalline polyester resin, water, and surfactants, and generating or providing a colorant dispersion containing colorant, water, and an ionic surfactant, or a nonionic surfactant; (ii) blending the latex emulsion with the colorant dispersion and optional additives, such as a wax; (iii) adding to the resulting blend a coagulant comprising a polymetal ion coagulant, a metal ion coagulant, a polymetal halide coagulant, a metal halide coagulant, or mixtures thereof; (iv) aggregating by heating the resulting mixture below, or about equal to the glass transition temperature (Tg) of the mixture that contains the amorphous polyester resin to form a core; (v) adding a styrene acrylate shell polymer; (vi) introducing a sodium hydroxide solution to increase the pH of the mixture resulting to about 4, followed by the addition of a sequestering agent to partially remove coagulant metal from the aggregated toner in a controlled manner; (vii) heating the resulting mixture of (vi) from about equal to, or about above the Tg of the amorphous polyester resin mixture at a pH of from about 7 to about 9; (viii) retaining the heating until the fusion, or coalescence of resins and colorant are initiated; (ix) changing the pH of the above (viii) mixture to arrive at a pH of from about 6 to about 7.5 thereby accelerating the fusion or the coalescence, and resulting in toner particles comprised of a core of the amorphous polyester, the crystalline polyester, wax, and colorant, and thereover a styrene acrylic shell; and a (x) optionally isolating the toner.

To control aggregation and coalescence of the particles, the aggregating agent can, if desired, be metered into the resin containing mixture selected over a period of time. For example, the aggregating agent can be metered into the resin containing mixture over a period of, in one embodiment, at least from about 5 minutes to about 240 minutes, from about 5 to about 200 minutes, from about 10 to about 100 minutes, from about 15 to about 50 minutes, or from about 5 to about 30 minutes. The addition of the agent can also be performed while the mixture is maintained under stirred conditions of about 50 rpm (revolutions per minute) to about 1,000 rpm, from about 100 rpm to about 500 rpm, although the mixing speed can be outside of these ranges, and at a temperature that is below the glass transition temperature of the amorphous polyester resin of, for example, from about 10° C. to about 40° C., although the temperature can be outside of these ranges.

The particles formed can be permitted to aggregate until a predetermined desired particle size is obtained, and where the particle size is monitored during the growth process until the desired or predetermined particle size is achieved. Composition samples can be removed during the growth process and analyzed, for example, with a Coulter Counter to measure the average particle size. Aggregation can then proceed by maintaining an elevated temperature, or by slowly raising the temperature as illustrated herein to, for example, from about 35° C. to about 100° C., from about 50° C. to about 90° C., or from about 35° C. to about 45° C., and retaining the mixture resulting at this temperature for a time period of, for example, from about 0.5 hour to about 6 hours, or from about 1 hour to about 5 hours while maintaining stirring to provide the aggregated particles. Once the predetermined desired particle size is reached, the growth process is halted.

The growth of the aggregated particles can be achieved by adjusting the pH of the mixture with a base to a value of from about 6 to about 10, or from about 6.2 to about 7. The adjustment of the pH can be used to freeze, that is to stop toner particle growth. The base used to cease toner growth can include alkali metal hydroxides, including sodium hydroxide and potassium hydroxide, ammonium hydroxide, mixtures thereof, and the like. In specific embodiments, ethylene diamine tetraacetic acid (EDTA) can be added to help adjust the pH to the desired values. In specific embodiments, the base can be added to the aggregated mixture in amounts of from about 2 percent by weight to about 25 percent by weight, or from about 4 to about 10 percent by weight of the mixture.

The growth and shaping of the particles following addition of the aggregation agent can be performed under any suitable conditions. For example, the growth and shaping can be conducted under conditions in which aggregation occurs separate from coalescence.

Following aggregation to the desired particle size, the particles can then be coalesced to the desired final shape, which coalescence is achieved by, for example, heating the mixture to any desired or effective temperature of from about 55° C. to about 100° C., from about 75° C. to about 90° C., from about 65° C. to about 75° C., or about 70° C., which temperatures can be below the melting point of the crystalline resin to prevent or minimize plasticization.

Coalescence can be performed over any desired or effective period of time, such as from about 0.1 hour to about 10 hours, from about 0.5 hour to about 8 hours, or about 4 hours.

After coalescence, the particle mixture can be cooled to room temperature, typically from about 20° C. to about 25° C. The cooling can be rapid or slow as desired. A suitable cooling method can include introducing cold water to a jacket around the vessel or reactor containing the coalesced toner particles. When cooling is completed, the toner particles can be washed with water and then dried. Drying can be performed by any suitable method including, for example, freeze drying resulting in toner particles possessing a relatively narrow particle size distribution with a low number ratio geometric standard deviation ($GSD_n$) of from about 1.15 to about 1.40, of from about 1.18 to about 1.25, of from about 1.20 to about 1.35, or from about 1.25 to about 1.35.

The toner particles prepared in accordance with the present disclosure can, in embodiments, have a volume average diameter as disclosed herein (also referred to as "volume average particle diameter" or "$D50_v$"), and more specifically, from about 1 micron to about 25 microns, from about 1 micron to about 15 microns, from about 1 micron to about 10 microns, or from about 2 microns to about 5 microns. $D50_v$, $GSD_v$, and $GSD_n$ can be determined by using a measuring instrument, such as a Beckman Coulter Multisizer 3, operated in accordance with the manufacturer's instructions. Representative sampling can occur as follows. A small amount of toner sample, about 1 gram, can be obtained and filtered through a 25 micrometer screen, then placed in isotonic solution to obtain a concentration of about 10 percent, with the sample then being subjected to the Beckman Coulter Multisizer 3.

The disclosed toner particles can have a shape factor of from about 105 to about 170, or from about 110 to about 160, SF1*a as measured by Scanning Electron Microscopy (SEM) image analysis (IA). The average particle shapes are quantified by employing the following shape factor (formula SF1*a=100d2/(4A)), where A is the area of the particle and d is its major axis. A perfectly circular or spherical particle has a shape factor of exactly 100. The shape factor SF1*a increases as the shape becomes more irregular or elongated in shape with a higher surface area.

Additionally, the toners disclosed herein possess low melting, or ultra-low melting temperature characteristics for the low melting toners displaying a melting point of from about 80° C. to about 130° C., or from about 90° C. to about 120° C., while ultra-low melt toners display a melting point of from about 50° C. to about 100° C., or from about 55° C. to about 90° C.

Toner Additives

Any suitable surface additives may be selected for the disclosed toner compositions. Examples of additives are surface treated fumed silicas, for example TS-530® obtainable from Cabosil Corporation, with an 8 nanometer particle size and a surface treatment of hexamethyldisilazane; NAX50® silica, obtained from DeGussa/Nippon Aerosil Corporation, coated with HMDS; DTMS® silica, obtained from Cabot Corporation, comprised of a fumed silica silicon dioxide core L90 coated with DTMS; H2050EP®, obtained from Wacker Chemie, coated with an amino functionalized organopolysiloxane; metal oxides such as $TiO_2$, for example MT-3103®, available from Tayca Corporation, with a 16 nanometer particle size and a surface treatment of decylsilane; SMT5103®, obtainable from Tayca Corporation, comprised of a crystalline titanium dioxide core MT500B coated with DTMS; P-25®, obtainable from Degussa Chemicals, with no surface treatment; alternate metal oxides such as aluminum oxide, and as a lubricating agent, for example, stearates or long chain alcohols, such as UNXLIN 700®, and the like. In general, silica is applied to the toner surface for toner flow, triboelectric enhancement, admix control, improved development and transfer stability, and higher toner blocking temperatures. $TiO_2$ is added for improved relative humidity (RH) stability, tribo control, and improved development and transfer stability.

The surface additives of, for example, silicon oxides and titanium oxides, which should, more specifically, possess a primary particle size greater than approximately 30 nanometers, or at least 40 nanometers, with the primary particles size being measured by, for instance, transmission electron microscopy (TEM), or calculated (assuming spherical particles) from a measurement of the gas absorption, or BET surface area, are applied to the toner surface with the total coverage of the toner being, for example, from about 140 to about 200 percent theoretical surface area coverage (SAC), where the theoretical SAC is calculated assuming all toner particles are spherical and have a diameter equal to the volume median diameter of the toner as measured by the standard Coulter Counter method, and that the additive particles are distributed as primary particles on the toner surface in a hexagonal close packed structure.

Calcium stearate and zinc stearate can also be selected as toner additives primarily providing for toner lubricating properties, developer conductivity, and triboelectric charge enhancement, higher toner charge and charge stability by increasing the number of contacts between the toner and carrier particles. Examples of the stearates are SYNPRO®, Calcium Stearate 392A and SYNPRO®, Calcium Stearate NF Vegetable, or Zinc Stearate-L. In embodiments, the toners contain from, for example, about 0.1 to about 5 percent by weight of titania, from about 0.1 percent by weight to about 8 percent by weight of silica, and from about 0.1 percent by weight to about 4 percent by weight of the toner of calcium, or zinc stearate.

Developer Compositions

Also encompassed by the present disclosure are developer compositions comprised of the toners illustrated herein and carrier particles. In embodiments, developer compositions comprise the disclosed toner particles mixed with carrier particles to form a two-component developer composition. In some embodiments, the toner concentration in the developer composition may range from about 1 percent by weight to about 25 percent by weight, or from about 2 percent by weight to about 15 percent by weight based on the developer solids.

Examples of carrier particles suitable for mixing with the disclosed toner compositions include those particles that are capable of triboelectrically obtaining a charge of opposite polarity to that of the toner particles, such as granular zircon, granular silicon, glass, steel, nickel, ferrites, iron ferrites, silicon dioxide, and the like. The selected carrier particles can be used with or without a coating, the coating generally being comprised of fluoropolymers, such as polyvinylidene fluoride resins; terpolymers of styrene; methyl methacrylate; silanes, such as triethoxy silane; tetrafluoroethylenes; other known coatings; and the like.

In applications in which the described toners are used with an image-developing device employing roll fusing, the carrier core may be at least partially coated with a polymethyl methacrylate (PMMA) polymer commercially available from Soken Chemicals, and having a weight-average molecular weight of from about 300,000 to about 350,000. PMMA is an electropositive polymer that will generally impart a negative charge on the toner by contact. The carrier coating has, in embodiments, a coating weight of from about 0.1 percent by weight to about 5 percent by weight, or from about 0.5 percent by weight to about 2 percent by weight of the carrier.

The carrier coating PMMA may optionally be copolymerized with any desired comonomer, such as monoalkyl or dialkyl amines like dimethylaminoethyl methacrylates, diethylaminoethyl methacrylates, diisopropylaminoethyl methacrylates, tert-butyl amino ethyl methacrylates, and mixtures thereof. The carrier particles may be prepared by mixing the carrier core with from about 0.05 percent by weight to about 10 percent by weight of the PMMA copolymer, such as from about 0.05 percent by weight to about 3 weight percent of polymer, based on the weight of the coated carrier particles, until the polymer coating adheres to the carrier core by mechanical impaction and/or electrostatic attraction. Various effective suitable means can be used to apply the polymer to the surface of the carrier core particles by, for example, cascade roll mixing, tumbling, milling, shaking, electrostatic powder cloud spraying, fluidized bed, electrostatic disc processing, and with an electrostatic curtain. The mixture of carrier core particles and polymer is then heated to melt and fuse the polymer to the carrier core particles. The coated carrier particles are then cooled and classified to a desired particle size.

Carrier particles can be mixed with toner particles in any suitable combination in embodiments. In some embodiments, for example, about 1 to about 5 parts by weight of toner particles are mixed with from about 10 to about 300 parts by weight of the toner particles.

The toner compositions disclosed may also include known charge additives in effective amounts, such as from about 0.1 to about 5 weight percent, such as alkyl pyridinium halides, bisulfates, the charge control additives of U.S. Pat. Nos. 3,944,493; 4,007,293; 4,079,014; 4,394,430; and 4,560,635, the disclosures of which are totally incorporated herein by reference. Surface additives that can be added to the toner compositions include, for example, those disclosed herein like metal salts, metal salts of fatty acids, colloidal silicas, metal oxides, mixtures thereof, and the like, which additives are usually present in an amount of from about 0.1 percent by weight to about 2 percent by weight, reference U.S. Pat. Nos. 3,590,000; 3,720,617; 3,655,374, and 3,983,045, the disclosures of each of these patents totally incorporated herein by reference. Examples of specific suitable additives include zinc stearate and AEROSIL R972®, available from Degussa Chemicals, in amounts of from about 0.1 percent by weight to about 2 percent by weight, which additives can be added during the aggregation process or blended into the formed toner product.

The present disclosure provides a method of developing a latent xerographic image comprising applying the toner composition described herein to a photoconductor, transferring the developed image to a suitable substrate like paper, and fusing the toner composition to the substrate by exposing the toner composition to heat and pressure.

Specific embodiments will now be described in detail. These examples are intended to be illustrative, and are not limited to the materials, conditions, or process parameters set forth therein. All parts are percentages by weight unless otherwise indicated.

EXAMPLE I

There was prepared an emulsion that contains a crystalline polyester resin as follows.

An aqueous emulsion of the crystalline polyester resin poly(1,9-nonylene-succinate), available from DIC Chemicals, was prepared by dissolving 100 grams of this resin in ethyl acetate (600 grams). The resulting mixture was then added to 1 liter of water containing 2 grams of sodium bicarbonate, and homogenized for 20 minutes at 4,000 rpm, followed by heating to 80° C. to 85° C. to distill off the ethyl acetate. The resultant aqueous crystalline polyester emulsion had a solids content of 32.4 percent by weight, and displayed a particle size thereof of 155 nanometers as determined with a Coulter Counter.

EXAMPLE II

There was prepared an emulsion containing a crystalline polyester resin as follows:

An aqueous emulsion of the crystalline polyester resin poly(1,6-hexylene-succinate), obtained from DIC Chemicals, was prepared by dissolving 100 grams of this resin in ethyl acetate (600 grams). The mixture obtained was then added to 1 liter of water containing 2 grams of sodium bicarbonate, and homogenized for 20 minutes at 4,000 rpm, followed by heating to 80° C. to 85° C. to distill off the ethyl acetate. The resultant aqueous crystalline polyester emulsion had a solids content of 35 percent by weight, and displayed a particle size thereof of 150 nanometers as determined with a Coulter Counter.

EXAMPLE III

Bio-Based Amorphous Polyester Synthesis I

There were prepared two separate resins A and B of copoly-(bis-rosin-neopentylene-terephthalate)-copoly-(bis-rosin-neopentylene-succinate) of differing weight average molecular weight and differing number average molecular weights as follows.

To a 1 liter Parr reactor were added a rosin (Arakawa KR614) comprised primarily of disproportionated dehydroabietic acid (180 grams), bis-(epoxy-propyl)-neopentylene glycol (76 grams), and tetraethyl ammonium bromide catalyst (0.35 gram). The resulting mixture, under a pressure of 12 mm-Hg, was heated from 105° C. to 160° C. over a four hour period with stirring under a nitrogen bleed. To the resulting mixture there were added 1,2-propanediol (183 grams), dimethyl terephthalate (231 grams), succinic acid (19.2 grams), and FASCAT 4100 catalyst (1.5 grams). The mixture resulting was then heated from 160° C. to 195° C. over a six hour period, followed by increasing the temperature to 210° C. over a two hour period, followed by reducing the pressure to 10 mm-Hg. The obtained mixture was then heated to 225° C. until the desired softening point was obtained. During the polycondensation process, by products of water, methanol and glycol were removed by distillation. The resins A and B generated of copoly-(bis-rosin-neopentylene-terephthalate)-copoly-(bis-rosin-neopentylene-succinate) were then discharged through a bottom drain valve, and left undisturbed to cool to room temperature.

Resin B had a higher weight average molecular weight, see Example IV below, and a higher number average molecular weight versus resin A, achieved by heating from the resin B mixture to 160° C. to 195° C. over a period of 12 hours instead of 6 hours.

EXAMPLE IV

Bio-Based Amorphous Polyester Synthesis II

There were prepared two separate bio-based amorphous polyesters A and B of copoly-(bis-rosin-neopentylene-terephthalate)-copoly-(bis-rosin-neopentylene-succinate) with different softening points (molecular weights) as follows and the properties thereof are provided in Table 1.

A five gallon reactor was charged with 2.79 Kg (kilograms) of Foral AX (Rosin Acid), 1.32 Kg of neopentyl glycol diglycidyl ether, and 4.6 grams of tetraethyl ammonium bromide. The resulting mixture was then heated to 175° C. over a three hour period with stirring under nitrogen, and then the mixture was maintained at 175° C. for five more hours until the acid value of the resulting rosin diol was 0.59 mg of KOH/g.

To the mixture obtained were then added 5.1 Kg of bio-based propylene glycol, 960 grams of sebacic acid, 8.3 Kg of terephthalic acid, and 50 grams of TC400 catalyst. The mixture resulting was heated to 221° C. over a two hour period and maintained at 221° C. at a pressure of 201 kPa for an additional nine hours. The obtained mixture was then heated to 220° C. (without pressure), followed by vacuum distillation for two hours, and half (50 percent) of the batch was discharged into a metal container to result in Resin A. The remaining half content of the material in the reactor was heated under vacuum for an additional hour, followed by discharge into a metal container to result in resin B.

The acid value in mg KOH/g was measured by the manual titration of the resin in tetrahydrofuran solvent with a I N Methanol KOH titrant; the $M_n$ and $M_w$ were measured using gel permeation chromatography with polystyrene as solvents; the softening point, Ts, was measured using the Mettler FP83HT Dropping Point Cell apparatus, and the glass transition temperature, Tg, was measured utilizing a DuPont 910 differential scanning calorimeter.

TABLE 1

| Bio-Resin | Ts° C. | Av. mg KOH/g | Tg° C. | $M_n$ g/mole | $M_w$ g/mole |
| --- | --- | --- | --- | --- | --- |
| Resin A | 119.4 | 11.8 | 58.9 | 6,341 | 26,604 |
| Resin B | 123.3 | 9.8 | 58.2 | 6,610 | 58,200 |

Latex Preparations

A latex containing resin A of Example IV was prepared by the standard known Phase Inversion Process as follows.

A solution of resin A was prepared by the mixing thereof with the resins methylethylketone (MEK) and isopropanol (IPA) in a ratio of 10:10:1. To the resulting resin solvent mixture there were then added 4.70 grams of 10 percent ammonia hydroxide (10 percent solution), followed by the addition of 220 grams of water, which water was added slowly with mixing. The mixture obtained was then heated to 60° C. to remove the solvents thereby forming a latex containing resin A, and where the particles thereof had a diameter of 181.1 nanometers as determined by a Coulter Counter.

A latex containing the resin B of Example IV was prepared as follows.

In a five gallon reactor there was charged 4.22 Kg of the above resin B, 2.83 Kg of methyl ethyl ketone and 630 grams of isopropanol. The resulting mixture was heated to 40° C. with stirring, and to this was added an aqueous solution of 204 grams of ammonium hydroxide (10 percent solution), followed by the addition of 12.7 liters of water at a rate of 0.83 Kg/minute. The mixture obtained was then heated to 55° C. after which a vacuum was applied to remove the solvents to result in a latex where the particles thereof, as determined by a Coulter Counter, had a diameter of 188 nanometers.

EXAMPLE V

Toner Preparation

Into a 2 liter glass reactor equipped with an overhead stirrer there were added 8.10 grams, 13.45 weight percent, of the cyan PIGMENT BLUE 15:3® dispersion (available from Sun Chemicals), 38.86 grams of the carbon black dispersion Nipex-35 (16.55 percent by weight), 71.22 grams of the above prepared Example IV resin A latex (40.98 percent by weight) and 58.46 grams (9 percent by weight) of the above prepared Example I crystalline resin latex, followed by mixing. The pH of resulting mixture was adjusted to 2.80, and then the mixture was stirred at 4,000 rpm using an IKA Ultra-Turrax homogenizer. Twenty four grams (24.0 grams) of a polyaluminum chloride solution were then added dropwise as a flocculent and with continued homogenization. Subsequently, the resulting mixture was heated from room temperature, about 25° C. to 46° C. at a rate of 1° C./minute with stirring at about 220 rpm. The particle size was monitored with a Coulter Counter until there resulted core particles that had a volume average particle size of 5.53 microns. Then, 24.91 grams of a (25 weight percent) of polystyrene methacrylate were added as a shell material, resulting in core-shell structured particles with an average size of 6.21 microns.

Thereafter, the pH of the above obtained slurry was increased to 4.4 by the addition of 1.57 grams of EDTA (39 percent by weight) and the pH was adjusted to 7.90 by adding 9.42 grams of 0.3M NaOH solution to freeze the toner growth. After freezing, the reaction mixture was heated to 70° C. and the pH of mixture was decreased to 5.5 by the addition of 15.41 grams of 0.3 M HNO3. The temperature of the resulting reaction mixture was increased to 75° C. and maintained at this temperature for a total of 90 minutes to enable coalescence. The toner obtained was quenched in water and had a final particle size of 7.65 microns as measured with a Multisizer 3® Coulter Counter, available from Beckman Coulter, and a circularity of 0.969. The toner slurry was then cooled to room temperature, separated by sieving (25 μm) filtration, followed by washing and freeze dried.

There resulted a toner core comprised of 6 percent by weight of the colorant mixture Nipex-35 carbon black and 1 percent by weight of the PIGMENT BLUE 15:3®, 59 percent by weight of the non-bisphenol bio-based amorphous polyester Resin A and 9 percent by weight of the crystalline polyester resin poly(1,6-hexylene-1,12-dodecanoate), and a shell comprised of 25 percent by weight of polystyrene methacrylate shell.

Properties of the toner of Example V, were determined by fusing samples of the toner utilizing the Xerox Corporation DocuColor 700 to Xerox Corporation Color Xpressions Select (90 gsm) paper, where gsm is a measure of the density of the paper in grams per square meter; the lower this value of 90 gsm is results in a thinner paper, and the higher this value of 90 gsm is results in a thicker paper. The minimum fix temperature (MFT) of the toner of Example V is 138° C., the hot-offset temperature is 220° C., and the fusing operational latitude is 82° C. These results were very similar to the fusing performance of the Xerox Corporation Docucolor 700 Black Toner benchmark.

Hot offset occurs when the temperature of the toner was raised to a point where the toner particles liquefy and a splitting of the molten toner takes place during the fusing operation with a portion of the toner remaining on the fuser member. The hot offset temperature is a measure of the release property of the fuser member, and accordingly, it is desirable to provide a fusing surface that has a low surface energy to permit the efficient release of toner. To ensure and maintain good release properties for the fuser member, it is known to apply release agents thereto to ensure that the toner is completely released from the fuser member during the fusing operation. Typically, these release agents are applied as thin films of, for example, silicone oils. In addition to preventing hot offset, it is desirable to provide a large temperature operational latitude. By operational latitude, it is intended to mean, for example, the difference in temperature between the minimum temperature required to fix the toner to the paper, often referred to as the minimum fix temperature, and the temperature at which the hot toner will offset to the fuser member, or the hot offset temperature.

The blocking temperature for the toner of Example V was 52.7° C. determined as follows.

Five grams of toner samples were weighted into an open dish and conditioned in an environmental chamber at various temperatures between 49° C. and 54° C., and 50 percent relative humidity. After 24 hours, the samples were removed and acclimated at ambient conditions for 30 minutes, each re-acclimated toner sample was then poured into a stack of two pre-weighed mesh sieves, which are stacked as follows; 1,000 microns (m) on top and 106 m on the bottom. The sieves were vibrated for 90 seconds at 1 mm amplitude with a Hosokawa flow tester. After the vibration was completed, the sieves were reweighed and the toner heat cohesion was calculated from the total amount of toner remaining on both sieves as a percentage of the starting weight. The highest temperature at which the cohesion was 20 percent or less was recorded as the 52.7° C. blocking temperature.

The Crease Minimum Fixing Temperature (MFT), which was excellent and similar to the Xerox Corporation Docu-Color™, was based upon how well the toner adheres to paper as determined by its crease fix minimum fusing temperature (MFT). The fused image was folded and a 860 gram weight was rolled across the fold after which the page was unfolded and wiped to remove the fractured toner from the sheet. This sheet was then scanned using an Epson flatbed scanner and the area of toner which has been removed from the paper was determined by image analysis software such as by using the National Instruments IMAQ. Optical comparison of the crease area was then determined from a series of images with a known amount of crease area removed for optical comparison, which indicates the acceptable level of toner adhesion; alternatively, the crease area can be quantified by computer image analysis. The smaller the area which has lost toner, the better the toner adhesion, and the temperature required to achieve an acceptable level of adhesion was calculated as the crease fix or MFT.

A toner composition is prepared by repeating the above procedure with the exception that Resin B can be substituted for Resin A.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A toner composition comprising a core comprising a bio-based amorphous polyester resin, a crystalline polyester resin, and a colorant, and a polymer shell thereover said core and wherein said bio-based amorphous polyester resin is selected from the group consisting of poly(bis-rosin-neopentylene-terephthalate), poly(bis-rosin-neopentylene-isophthalate), copoly-(bis-rosin-neopentylene-terephthalate) copoly-(bis-rosin-neopentylene-succinate), copoly-(bis-rosin-neopentylene-isophthalate)-copoly-(bis-rosin-neopentylene-succinate), and mixtures thereof.

2. A toner in accordance with claim 1 wherein said bio-based amorphous polyester resin is generated with monomers of a rosin acid selected from the group consisting of those as represented by one of the following formulas/structures

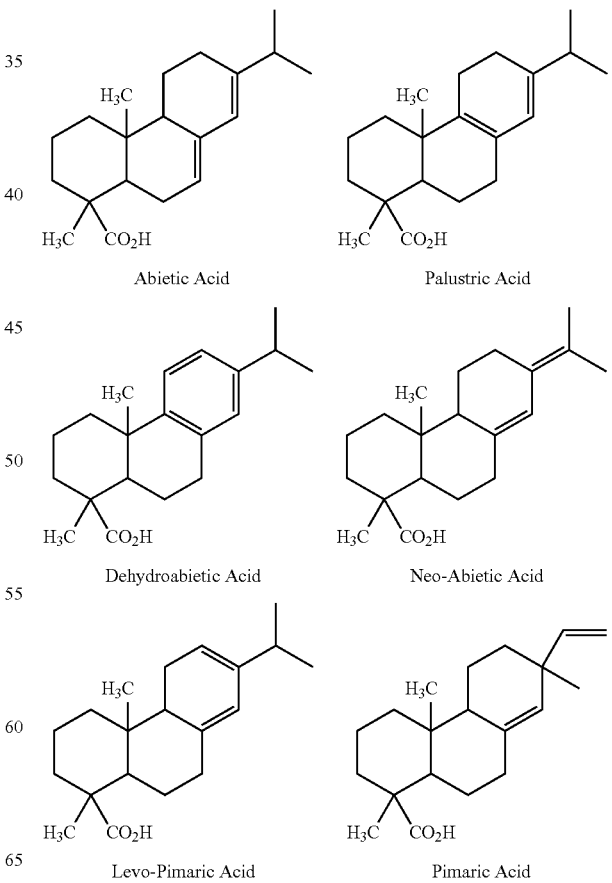

Abietic Acid

Palustric Acid

Dehydroabietic Acid

Neo-Abietic Acid

Levo-Pimaric Acid

Pimaric Acid

-continued

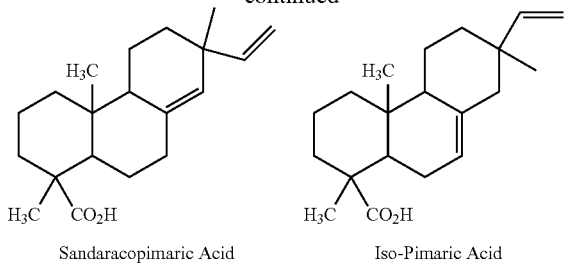

Sandaracopimaric Acid        Iso-Pimaric Acid and mixtures thereof.

3. A toner in accordance with claim 1 wherein said crystalline polyester resin comprises poly(1,6-hexylene-1, 12-dodecanoate).

4. A toner in accordance with claim 1 wherein said crystalline polyester resin comprises poly(1,9-nonylene-succinate).

5. A toner in accordance with claim 1 wherein said bio-based amorphous polyester resin is generated with monomers of a rosin acid and is selected from the group consisting of natural rosins of gum rosin, tall oil rosin or wood rosin, a disproportionated rosin acid, a hydrogenated rosin acid, a dehydroabietic acid pimaric acid, a sandarach-pimaric acid, a parastric acid, an isopimaric acid, an abietic acid, a dehydroabietic acid, a neoabietic acid, a dihydropimaric acid, a dihydroabietic acid, and a tetrahydroabietic acid.

6. A toner in accordance with claim 1 wherein said bio-based amorphous polyester resin is selected from the group consisting of poly (bis-rosin-neopentylene-isophthalate), copoly-(bis-rosin-neopentylene-terephthalate) copoly-(bis-rosin-neopentylene-succinate) and mixtures thereof, and wherein said crystalline polyester is selected from the group consisting of poly(1,6-hexylene-1,12-dodecanoate), poly(1,9-nonylene-succinate) and mixtures thereof.

7. A toner in accordance with claim 1 wherein said shell comprises a styrene acrylic selected from the group consisting of polystyrene-acrylate, polystyrene methacrylate, polystyrene-butadiene, polystyrene-2-ethylhexyl acrylate, polystyrene-2-ethylhexyl methacrylate, and mixtures thereof.

8. A toner in accordance with claim 1 wherein the crystalline polyester is selected from the group consisting of poly(1,2-propylene-diethylene) terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, poly(nonylene-sebacate), polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(1,2-propylene itaconate), poly(ethylene-succinate), poly(propylene-succinate), poly(butylene-succinate), poly(pentylene-succinate), poly(hexylene-succinate), poly(octylene-succinate), poly(decylene-decanoate), poly(ethylene decanoate), poly(ethylene dodecanoate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and mixtures thereof.

9. A toner in accordance with claim 1 wherein said shell encompasses from about 90 percent to about 100 percent of said core.

10. A toner in accordance to claim 1 wherein said colorant is a pigment.

11. A toner in accordance with claim 1 wherein said colorant is selected from at least one of carbon black, cyan, magenta, yellow, and mixtures thereof.

12. A toner in accordance with claim 1 further containing a wax.

13. A toner in accordance with claim 12 wherein said wax is selected from the group consisting of polyethylene, polypropylene, and mixtures thereof, and wherein said wax is present in an amount of from about 1 to about 10 percent by weight of the solids.

14. A toner in accordance with claim 1 wherein said bio-based amorphous polyester resin is prepared by the reaction of tetrahydroabietic acid, a bio-based alkylene glycol and a bio-based succinic acid in the presence of a catalyst.

15. A toner in accordance with claim 14 where said alkylene glycol is propylene glycol.

16. A toner in accordance with claim 1 wherein said bio-based amorphous polyester resin is generated in accordance with the following reaction scheme

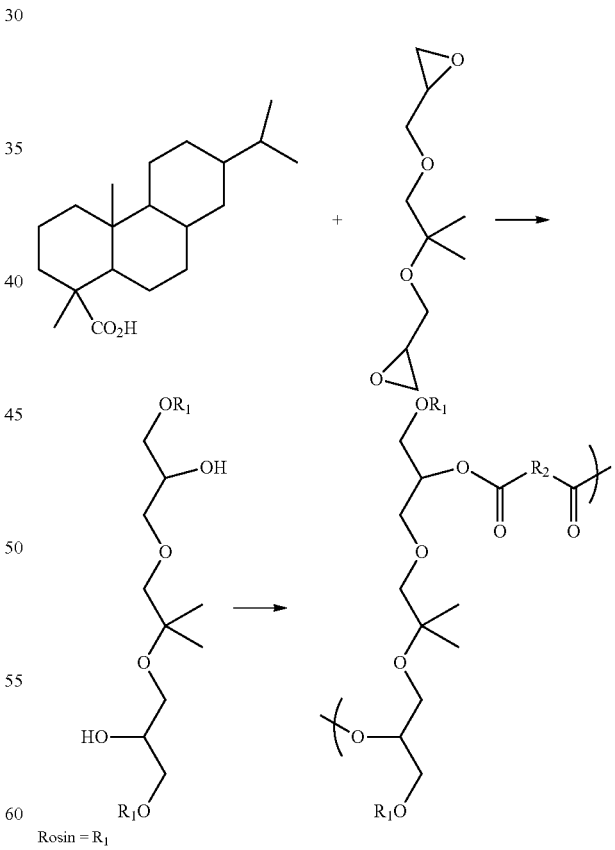

Rosin = $R_1$ wherein $R_1$ is a rosin and $R_2$ is arylene: $CH_2$—$CH_2$.

17. A toner in accordance with claim 1 where said crystalline polyester resin is selected from the group consisting of poly(1,6-hexylene-1,12-dodecanoate), poly(1,9- nonylene-succinate), and mixtures thereof and the amorphous polyester resin is copoly-(bis-rosin-neopentylene-terephthalate)-copoly-(bis-rosin-neopentylene-succinate).

18. A toner composition comprising a core comprising a mixture of a phenol free crystalline polyester, a bisphenol free bio-based amorphous polyester resin, colorant and optional wax, and where said bio-based amorphous polyester is selected from the group consisting of poly (bis-rosin-neopentylene-terephthalate), poly (bis-rosin-neopentylene-isophthalate), copoly-(bis-rosin-neopentylene-terephthalate)-copoly-(bis-rosin-neopentylene-succinate), copoly-(bis-rosin-neopentylene-isophthalate)-copoly-(bis-rosin-neopentylene-succinate), and mixtures thereof.

19. A toner in accordance with claim 18 wherein the crystalline polyester comprises poly(1,6-hexylene-1,12-dodecanoate), and the bio-based amorphous polyester is poly (bis-rosin-neopentylene-terephthalate), poly(bis-rosin-neopentylene-isophthalate).

20. A toner composition comprising a core of at least one bio-based amorphous polyester resin, at least one crystalline polyester, at least one wax, and at least one colorant, and thereover at least one polymer shell encasing said core and wherein said bio-based amorphous polyester resin is selected from the group consisting of poly (bis-rosin-neopentylene-terephthalate), poly (bis-rosin-neopentylene-isophthalate), copoly-(bis-rosin-neopentylene-terephthalate) copoly-(bis-rosin-neopentylene-succinate), copoly-(bis-rosin-neopentylene-isophthalate)-copoly-(bis-rosin-neopentylene-succinate), and mixtures thereof.

21. A toner composition in accordance with claim 20 wherein the crystalline polyester is selected from the group consisting of poly(1,6-hexylene-1,12-dodecanoate), poly(1,9-nonylene-succinate), and mixtures thereof, said bio-based amorphous polyester is selected from the group consisting of poly(bis-rosin-neopentylene-terephthalate), poly(bis-rosin-neopentylene-isophthalate), copoly-(bis-rosin-neopentylene-terephthalate)-copoly(bis-rosin-neopentylene-succinate), copoly-(bis-rosin-neopentylene-isophthalate)-copoly-(bis-rosin neopentylene-succinate), and mixtures thereof, wherein said amorphous polyester resin is present in an amount of from about 10 percent by weight to about 60 percent by weight, said crystalline polyester resin is present in an amount of from about 5 percent by weight to about 12 percent by weight; said wax is present in an amount of from about 4 percent by weight to about 9 weight percent; said colorant is present in an amount of from about 3 percent by weight to about 10 percent by weight of the solids; said at least one polymer shell is a styrene acrylate or a polystyrene-acrylate amorphous resin, and which toner is prepared by emulsion/aggregation/coalescent methods.

* * * * *